(12) United States Patent
Maurus et al.

(10) Patent No.: US 7,707,889 B2
(45) Date of Patent: May 4, 2010

(54) METHOD AND APPARATUS FOR DETERMINATION OF OSCILLATIONS ON A ROTATING BLADE DISC OF A TURBINE

(75) Inventors: Reinhold Maurus, Augsburg (DE); Frank Woditschka, Duisburg (DE)

(73) Assignee: Siemens Aktiengesellschaft, Munich (DE)

( * ) Notice: Subject to any disclaimer, the term of this patent is extended or adjusted under 35 U.S.C. 154(b) by 945 days.

(21) Appl. No.: 10/588,025

(22) PCT Filed: Jan. 27, 2005

(86) PCT No.: PCT/EP2005/000812

§ 371 (c)(1),
(2), (4) Date: Aug. 1, 2006

(87) PCT Pub. No.: WO2005/073679

PCT Pub. Date: Aug. 11, 2005

(65) Prior Publication Data

US 2007/0158586 A1 Jul. 12, 2007

(30) Foreign Application Priority Data

Feb. 2, 2004 (EP) .................................. 04002251

(51) Int. Cl.
*G01H 9/00* (2006.01)
*G01M 11/08* (2006.01)
*G01N 21/64* (2006.01)
*G01N 21/84* (2006.01)

(52) U.S. Cl. .................... 73/660; 250/459.1; 250/458.1

(58) Field of Classification Search .................... 73/660
See application file for complete search history.

(56) References Cited

U.S. PATENT DOCUMENTS

| 4,080,823 | A | | 3/1978 | Stargardter |
| 4,914,953 | A | | 4/1990 | Viscovich |
| 5,511,426 | A | * | 4/1996 | Clement et al. ............... 73/655 |
| 5,761,956 | A | | 6/1998 | Beeson et al. |
| 7,341,428 | B2 | * | 3/2008 | Twerdochlib .................. 416/1 |
| 2003/0118442 | A1 | * | 6/2003 | Woditschka ................... 416/1 |
| 2006/0000283 | A1 | * | 1/2006 | Twerdochlib ................ 73/593 |

FOREIGN PATENT DOCUMENTS

JP 63304120 A 12/1988

(Continued)

OTHER PUBLICATIONS

T. Liu, S. Torgerson, J. Sullivan, R. Johnston and S. Fleeter, "Transonic Rotor Blade Pressure Measurement Using Fluorescent Paints", Journal of Propulsion and Power, 2002, pp. 491-493, vol. 18, Part 2, American Institute of Aeronautics and Astronautics, XP 008032861, USA.

*Primary Examiner*—Hezron Williams
*Assistant Examiner*—Rose M Miller

(57) ABSTRACT

A method for determining oscillations of a rotating blade disc of a turbomachine is provided. The method utilizes the steps including, arranging a substance that emits a light quanta when excited by an external excitation source to emit the light quanta, exciting the light emitting substance by the external excitation source to emit the light quanta, sensing the emitted light quanta by a light sensor, and evaluating a signal from the sensor tot determine the osciallation behavior of the blade disc. A corresponding apparatus is also provided.

16 Claims, 3 Drawing Sheets

FOREIGN PATENT DOCUMENTS

| | | |
|---|---|---|
| JP | 02171618 A | 7/1990 |
| JP | 11513801 | 11/1999 |
| JP | 2000321206 A | 11/2000 |
| JP | 2002071565 A | 3/2002 |
| JP | 2002303103 A | 10/2002 |
| WO | 9714939 A1 | 4/1997 |
| WO | 00/68668 A1 | 11/2000 |

* cited by examiner

US 7,707,889 B2

METHOD AND APPARATUS FOR DETERMINATION OF OSCILLATIONS ON A ROTATING BLADE DISC OF A TURBINE

CROSS REFERENCE TO RELATED APPLICATIONS

This application is the US National Stage of International Application No. PCT/EP2005/000812, filed Jan. 27, 2005 and claims the benefit thereof. The International Application claims the benefits of European Patent application No. 04002251.9 filed Feb. 2, 2004. All of the applications are incorporated by reference herein in their entirety.

FIELD OF THE INVENTION

The invention relates to a method and an apparatus for determination of oscillations on a rotating blade disc of a turbine, in which case the aim in particular is to carry out the oscillation measurement in a non-contacting manner.

BACKGROUND OF THE INVENTION

For many years, non-contacting oscillation measurements have been carried out successfully on blade discs of turbines, for example stationary gas turbines, by means of optical or inductive sensors, which produce considerable signals when individual blades on the blade disc pass by the sensor. Oscillation measurements such as these are required for monitoring purposes and in order to ensure safe operation of turbines.

In order to protect the individual blades on large-diameter blade discs against frequent bending loads, blades with so-called integral covering plates are now increasingly being used, and these result in an essentially closed covering strip structure on the blade disc. However, this closed covering strip structure has no target marks for optical or inductive sensors, which target marks could provide unambiguous signals for reliable analysis of the oscillation behavior of the blade disc. Suitable target marks with a defined arrangement would therefore have to be applied to the closed covering strip structure, from whose signals the oscillation behavior could be determined.

A further exacerbating factor in the case of gas turbines is that measurements must also be carried out reliably even when the locally occurring temperatures are high. For this reason, inductive measurement methods and ferromagnetic target marks that are required for them can be used only to a restricted extent, because the Curie temperature is exceeded.

U.S. Pat. No. 5,761,956 discloses an optical measurement method for determination of oscillations on a rotating blade disc of a gas turbine, in which different infrared thermal radiation from applied ceramic target marks with respect to the base body of the blade disc is detected. This measurement method cannot be used, however, until after the gas turbine has been operated for a certain time, because of the high temperatures which are required for infrared thermal radiation. While the gas turbine is being started up, the oscillation behavior cannot be monitored, however, which is disadvantageous to the operational reliability of the gas turbine.

SUMMARY OF THE INVENTION

The invention is based on the object of providing a method and an apparatus for determination of oscillations on a rotating blade disc of a turbine, which allows reliable determination of the oscillation behavior of the blade disc during virtually all operating states of the turbine, with high measurement reliability and high measurement accuracy.

According to the invention, this object is achieved by a method and an apparatus for determination of oscillations on a rotating blade disc of a turbine, in which a substance which emits light quanta by external excitation is arranged at at least one point on the blade disc, radiation is or can be transmitted by means of a radiation source at the rotating blade disc and at the substance which is arranged on it, in order to externally excite it, a sensor is provided for determination of light quanta emitted from the substance, and the signal is or can be evaluated by means of an evaluation circuit of the sensor, in order to determine the oscillation behavior of the blade disc.

According to the invention, the physical effect of emission of light quanta is used to determine oscillations of a blade disc of a turbine. A substance which emits light quanta emits the light quanta as a consequence of a three-stage process, which takes place in the atoms or molecules of the substance. In a first stage, the atoms or molecules of the substance are brought to a higher energetic state by means of an external radiation source, for example a UV light source or a laser, by absorption of a radiation quantum (in particular of a light quantum). In a second step, different energy levels are excited by movement of and collisions between the atoms and molecules with respect to one another, as a result of which the excitation energy is slightly decreased. In the third step, the individual atom or molecule reverts to the basic state, during which process it emits a photon at a relatively long wavelength, and a frequency shift occurs between the injected light and the emitted light.

According to the invention, by way of example, a long-wavelength UV lamp, which emits short-wave light ($\lambda=350$ nm) is used as the radiation source. By way of example, the substance which emits light quanta is formed by fluorescent particles which absorb the short-wave light and emit light at longer wavelengths which, depending on the material characteristics, are normally between 500 and 600 nm. By way of example, a ceramic adhesive or a flamespray may be added to the fluorescent particles, and is then applied to the blade disc in the form of target marks.

The non-contacting measurement method according to the invention makes it possible to carry out reliable and accurate measurements of oscillations in particular on shrouded turbine blades with a circumferential essentially closed, covering strip structure on the blade disc. The measurement method is particularly suitable for high operating temperatures, and can thus be used not only in gas turbines but also in steam turbines. The oscillation monitoring according to the invention is possible in all operating states of the respective turbine.

As already mentioned, the method according to the invention and the associated apparatus are particularly advantageous when the blades of the blade disc to be measured are connected to one another by means of an essentially closed covering strip structure. The target marks according to the invention and composed of a substance which emits light quanta can then advantageously be applied, for example in the form of strips, to the covering strip structure, and can then be used as defined strips comprising a thin layer of a substance which emits light quanta, as a target mark for a sensor which can determine the light quanta emitted from the substance. In an optical recording sensor such as this, in particular, the determined light quanta are converted to electrical signals, which are passed on, for example, to an evaluation computer for further processing and analysis. Oscillations on the blade disc can then be identified by comparing a specific expected arrival time with the actual arrival time for one individual target mark, by way of example. If the determined arrival time of a target mark occurs earlier or later than the expected arrival time, the blade disc is subject to vibration, that is to say the covering strip structure is moved slightly from its normal position because of the vibration.

This type of measurement and this procedure according to the invention can be used in the same manner in order to determine the oscillation behavior of at least one turbine blade on the blade disc. The target marks according to the invention which have been mentioned are in this case advantageously arranged on individual revolving turbine blades on the blade disc.

According to the invention, a fluorescent, a phosphorescent, a radio luminescent, a thermoluminescent, a triboluminescent and/or a photoluminescent substance is advantageously applied to the blade disc as a substance which emits light quanta as a result of external excitation. In other words, it is advantageously possible according to the invention to use all those physical processes in which light quanta or radiation quanta are emitted from a substance as a result of external excitation.

In order that the sensor which is used according to the invention essentially determines, as desired, only the light quanta which are emitted from the substance, an optical filter can be arranged in front of it, whose spectral window is matched to the wavelengths of the emitted light quanta. This makes it possible to separate the sensor signal optically from temperature-dependent infrared background radiation and from light which has been totally reflected on metal surfaces.

The useful signal from the substance which emits light quanta according to the invention has a relatively low light intensity. In order that the signal can nevertheless be unambiguously identified, it can be preprocessed for further evaluation, by means of an amplification circuit, in particular by means of photodiodes or photomultipliers.

BRIEF DESCRIPTION OF THE DRAWINGS

One exemplary embodiment of a method according to the invention and of an apparatus for determination of oscillations on a rotating blade disc of a turbine will be explained in more detail in the following text with reference to the attached schematic drawings, in which.

DETAILED DESCRIPTION OF THE INVENTION

Figure 1:
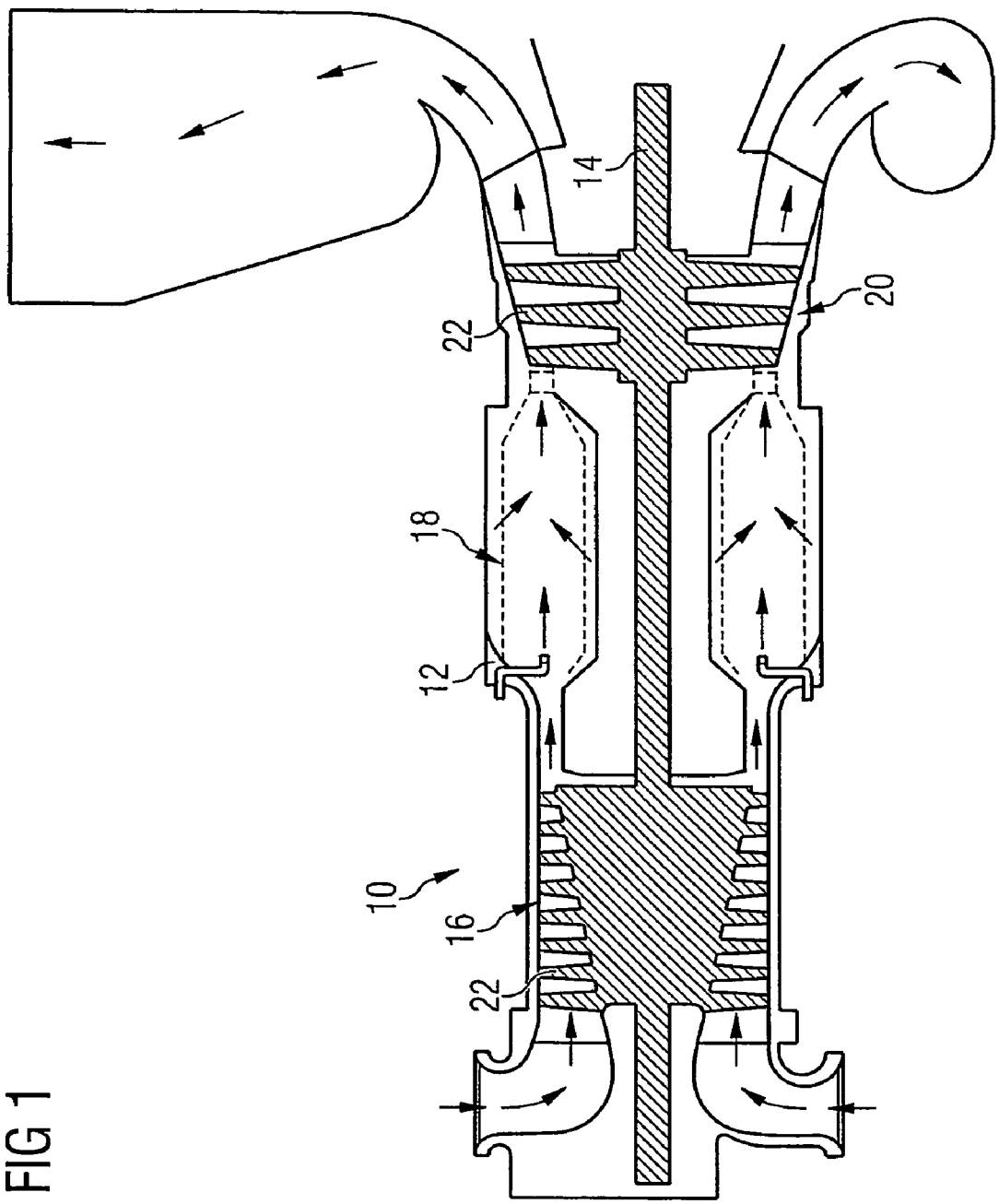
FIG. 1 shows a longitudinal section through one exemplary embodiment of a turbine having an apparatus according to the invention for determination of oscillations of a rotating blade disc.

FIG. 1 shows a simplified illustration of a turbine 10 which is in the form of a gas turbine and whose major components include a stator and a casing 12, as well as a rotor 14 which is mounted in it such that it can rotate.

The turbine 10 is essentially subdivided into three sections, a compressor section 16, a burner section 18 and a drive section 20. A plurality of blade discs 22, arranged such that they follow one another in the axial direction, are in each case arranged on the rotor 14 of the turbine 10 in the compressor section 16 and in the drive section 20.

Figure 2:
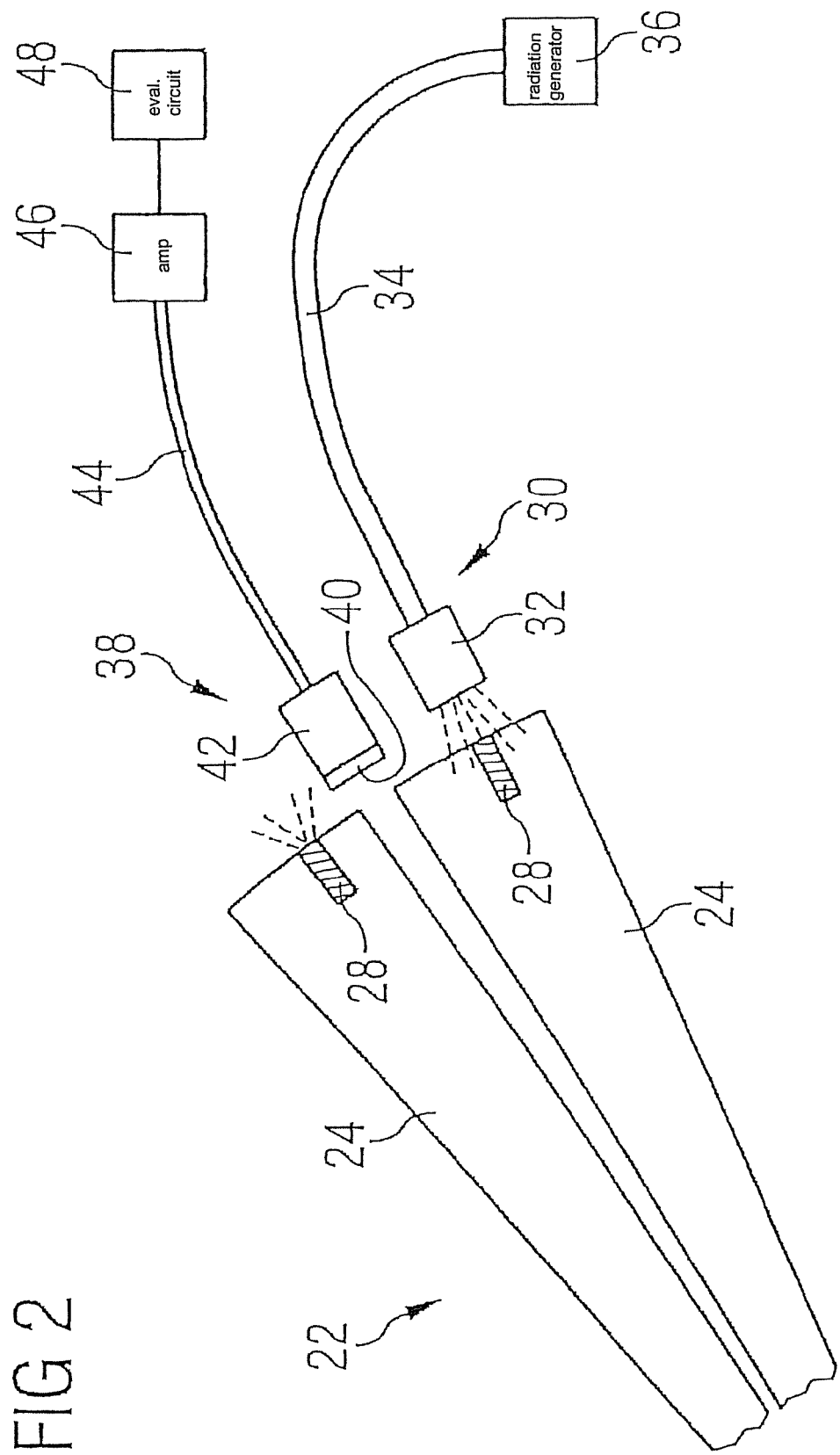
FIG. 2 shows a schematic view of a first exemplary embodiment of an apparatus according to the invention for determination of oscillations on a rotating blade disc of a turbine as shown in FIG. 1.
Figure 3:
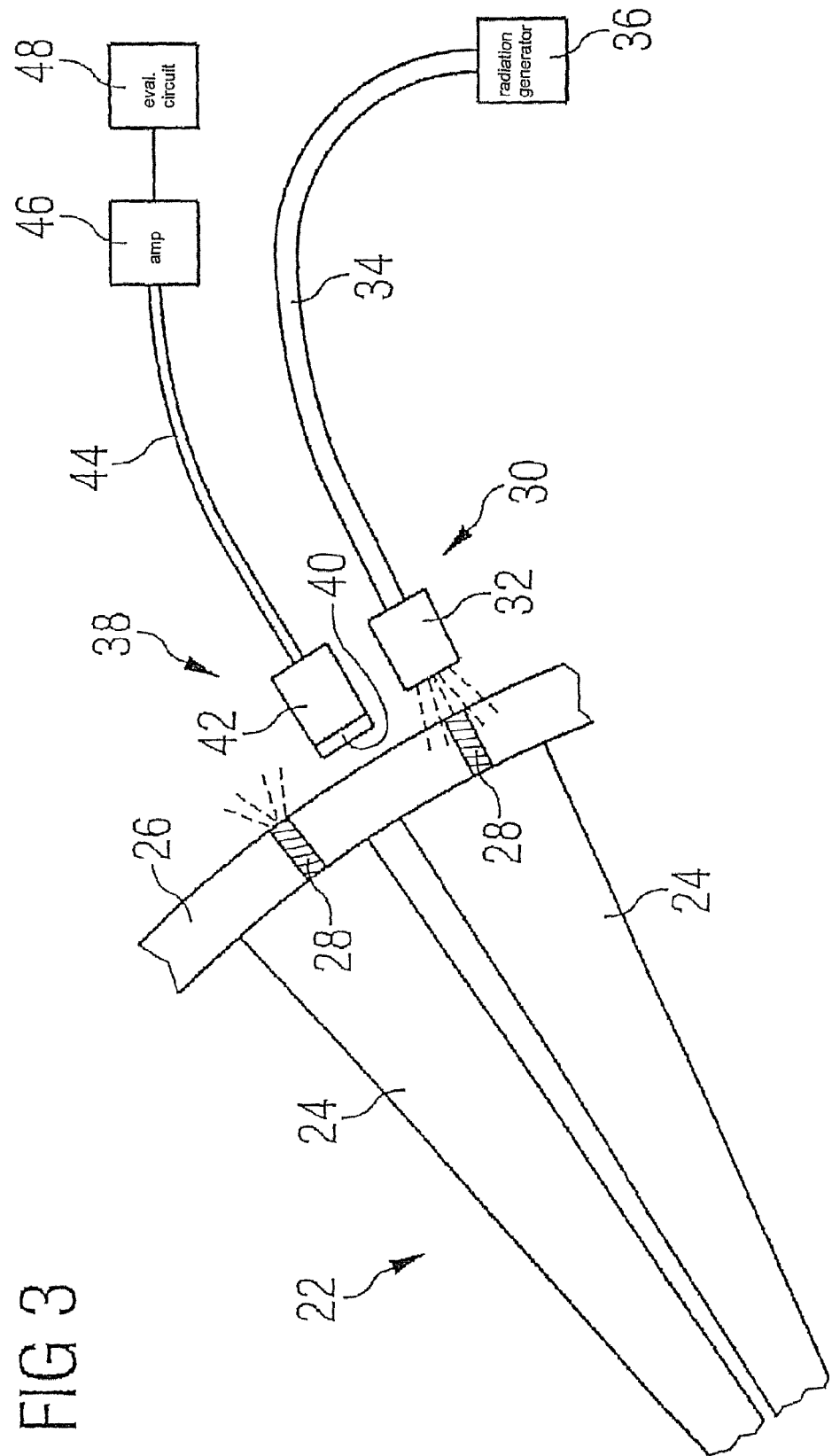
FIG. 3 shows a schematic view of a second exemplary embodiment of an apparatus according to the invention for determination of oscillations on a rotating blade disc of a turbine as shown in FIG. 1.

FIGS. 2 and 3 each show a section of a blade disc 22 such as this in a simplified form.

The blade disc 22 which is illustrated in FIG. 2 has a large number of turbine blades 24, a section comprising two of which is illustrated in FIG. 2.

In the case of the blade disc illustrated in FIG. 3, the radially outer end areas of the respective turbine blades 24 are connected to one another by means of a so-called covering strip structure 26 in the form of integral covering plates on the turbine blades 24.

In order to make it possible to determine the oscillation behavior of the blade discs 22 which rotate in the turbine 10, on the turbine 10, with high accuracy and reliability and in particular even when the temperatures in the drive section 20 are high, a plurality of apparatuses for determination of oscillations are arranged on the turbine 10, a first exemplary embodiment of which is illustrated in FIG. 2, with a second exemplary embodiment being illustrated in FIG. 3.

These apparatuses according to the invention for determination of the oscillation behavior of the respectively associated blade disc 22 are based on the principle of fluorescence, phosphorescence, radioluminescence, thermoluminescence, triboluminescence and/or photoluminescence. The apparatuses each have individual strips 28 of a substance which emits light quanta, which strips 28 in the exemplary embodiment illustrated in FIG. 2 are each arranged on the radially outer end area of the individual turbine blades 24, at regular intervals, while, in the case of the exemplary embodiment illustrated in FIG. 3, these strips 28 are formed on the covering strip structure 26. The substance which emits light quanta on the strips 28 is applied to the turbine blades 24 or to the covering strip structure 26 by ceramic adhesive, by way of example.

A radiation source 30 is arranged opposite the strips 28 and has optics 32, an optical fiber 34 and a radiation generator 36. The radiation which is produced by the radiation generator 36, for example UV radiation at a wavelength of about 350 nm, is passed through the optical fiber 34 to the optics 32, and is directed from there at the strips 28, which revolve with the respective blade disc 22.

A sensor 38 is arranged alongside the optics 32, and its major components include an optical filter 40, a receiving module 42, an electrical conductor 44, an amplifier 46 and an evaluation circuit 48.

The UV radiation which is produced and emitted by the radiation source 30 results in the substance of the strips 28 emitting light at a comparatively long wavelength, for example on the basis of the fluorescence principle, which wavelength is between about 500 and 600 nm, depending on the material characteristics of the substance. This emitted light can pass through the optical filter 40 when one of the strips 28 moves past it. Ideally, in this case, the radiation source 30 and its optics 32, and the sensor 38 and its filter 40, are located physically in the immediate vicinity or in the same area. This is because the fluorescence takes place for a comparatively short time period after excitation. A longer time period can be achieved using the principle of phosphorescence, so that the transmitter and receiver can also physically be arranged (further) away from one another.

The emitted light is passed to the receiving module 42, in which it is converted to an electrical signal and is then passed through the electrical conductor 44 to the amplifier 46, and finally to the evaluation circuit 48. The received signal is evaluated in the evaluation circuit 48, for further processing and for analysis of the oscillation behavior of the respective revolving blade disc 22.

The invention claimed is:

1. A method for determining oscillations of a rotating blade disc of a turbomachine, comprising:
    arranging a substance that emits a light quanta when excited by an external excitation source at a location on the blade disc;
    exciting the light emitting substance by the external excitation source to emit the light quanta;
    sensing the emitted light quanta by a light sensor; and
    evaluating a signal from the sensor to determine the oscillation behavior of the blade disc.

2. The method as claimed in claim 1, wherein the light emitting substance is arranged on a circumferentially closed covering strip structure of the blade disc.

3. The method as claimed in claim 2, further comprising evaluating the signal from the sensor to determine the oscillation behavior of the covering strip structure.

4. The method as claimed in claim 1, wherein the light emitting substance is arranged on a revolving turbine blade of the blade disc.

5. The method as claimed in claim 4, further comprising evaluating the signal from the sensor to determine the oscillation behavior of the turbine blade.

6. The method as claimed in claim 1, wherein the light quanta emitting material is applied in the form of a strip to either the blade disc, the covering strip structure or at least one turbine blade.

7. The method as claimed in claim 1, wherein the light quanta emitting substance type is selected from the group consisting of: a fluorescent, a phosphorescent, a radioluminescent, a thermoluminescent, a triboluminescent and/or a photoluminescent.

8. The method as claimed in claim 7, wherein an optical filter is arranged between the blade disc and the sensor.

9. The method as claimed in claim 8, wherein the signal from the sensor is amplified by a photodiode or a photomultiplier prior to evaluation.

10. An apparatus for determining rotating turbine blade disc oscillations, comprising:
    a light quanta emitting substance arranged on the blade disc which emits light quanta when excited by an external radiation source;
    a sensor that senses light quanta emitted from the externally excited substance and outputs a signal; and
    an evaluation circuit that evaluates the signal from the sensor and determines the oscillation behavior of the blade disc.

11. The apparatus as claimed in claim 10, wherein the light quanta emitting substance is applied to a closed and operatively rotating covering strip structure arranged on the blade disc, and the signal from the sensor is evaluated to determine the oscillation behavior of the covering strip structure.

12. The apparatus as claimed in claim 10, wherein the light quanta emitting substance is applied to a revolving turbine blade of the blade disc, and the signal from the sensor is evaluated to determine the oscillation behavior of the one turbine blade.

13. The apparatus as claimed in claim 12, wherein the light quanta emitting substance is applied in a strip form to either the blade disc, the covering strip structure, or at least one turbine blade.

14. The apparatus as claimed in claim 13, wherein the light quanta emitting substance type is selected from the group consisting of: fluorescent, phosphorescent, radioluminescent, thermoluminescent, triboluminescent and photoluminescent, and the sensor is an appropriately sensitive sensor to determine emitted light quanta.

15. The apparatus as claimed in claim 10, further comprising an optical filter arranged between the blade disc and the sensor.

16. The apparatus as claimed in claim 15, further comprising a photodiode or a photomultiplier amplifier circuit that amplifies the sensor signal before evaluation.

* * * * *